US009419428B2

(12) United States Patent
Qi et al.

(10) Patent No.: US 9,419,428 B2
(45) Date of Patent: Aug. 16, 2016

(54) PROTECTION DEVICE FOR DC COLLECTION SYSTEMS (71) Applicant: ABB Technology AG, Zurich (CH)

(72) Inventors: Li Qi, Cary, NC (US); Jiaqi Liang, Cary, NC (US); Jiuping Pan, Raleigh, NC (US)

(73) Assignee: ABB TECHNOLOGY AG, Zurich (CH)

( * ) Notice: Subject to any disclaimer, the term of this patent is extended or adjusted under 35 U.S.C. 154(b) by 159 days.

(21) Appl. No.: 14/278,832

(22) Filed: May 15, 2014

(65) Prior Publication Data
US 2015/0333504 A1 Nov. 19, 2015

(51) Int. Cl.
H02H 7/26 (2006.01)
H02H 3/087 (2006.01)
H02H 3/18 (2006.01)

(52) U.S. Cl.
CPC .................. *H02H 3/087* (2013.01); *H02H 3/18* (2013.01); *H02H 7/268* (2013.01)

(58) Field of Classification Search
CPC ...................................... H02H 7/268
USPC ............................................ 361/63
See application file for complete search history.

(56) References Cited

U.S. PATENT DOCUMENTS

| 4,722,059 | A | 1/1988 | Engel et al. |
| 4,951,634 | A | 8/1990 | Nishizawa et al. |
| 6,330,141 | B1 | 12/2001 | Elms |
| 8,067,942 | B2 | 11/2011 | Pan et al. |
| 2004/0027749 | A1 | 2/2004 | Zuercher et al. |
| 2004/0136124 | A1 | 7/2004 | Engel et al. |
| 2007/0100504 | A1 | 5/2007 | Moxley |
| 2007/0103833 | A1 | 5/2007 | Harris |
| 2008/0164766 | A1 | 7/2008 | Adest et al. |

(Continued)

FOREIGN PATENT DOCUMENTS

| CN | 102195275 A | 9/2011 |
| CN | 103457246 A | 12/2013 |

(Continued)

OTHER PUBLICATIONS

Cuzner, Robert M., "The Status of DC Micro-Grid Protection", IEEE Industry Applications Society Annual Meeting, 2008, IAS '08. Oct. 5-9, 2008. pp. 1-8. Edmonton, California, US.

(Continued)

*Primary Examiner* — Thienvu Tran
*Assistant Examiner* — Kevin J Comber
(74) *Attorney, Agent, or Firm* — Taft Stettinius & Hollister LLP (57) ABSTRACT A protection device includes a diode having its forward direction in a normal power flow of a region of a DC collection system, a first switch in parallel with the diode, a second switch in series with the diode and a control unit for controlling the switches. The first switch can be opened so that current can flow through the diode in the forward direction without the first switch bypassing the diode, and closed if no current is flowing through the diode in the forward direction and power is needed upstream of the diode. The second switch can be closed so that current can flow through the diode in the forward direction to an AC grid interface of the DC collection system, and opened if no current is flowing through the diode in the forward direction due to a fault in a DC feeder to which the device is coupled.

20 Claims, 8 Drawing Sheets

(56) References Cited

U.S. PATENT DOCUMENTS

| | | | |
|---|---|---|---|
| 2011/0090610 A1* | 4/2011 | Andresen | H01L 31/02021 361/57 |
| 2012/0281796 A1 | 11/2012 | Fitz et al. | |
| 2013/0027829 A1 | 1/2013 | Antoniazzi et al. | |
| 2013/0200714 A1* | 8/2013 | Pan | H02J 3/386 307/82 |
| 2013/0270902 A1* | 10/2013 | Andersen | H02H 3/08 307/9.1 |
| 2013/0271888 A1 | 10/2013 | Falk et al. | |
| 2013/0286521 A1* | 10/2013 | Park | H02H 7/268 361/57 |

FOREIGN PATENT DOCUMENTS

| | | |
|---|---|---|
| DE | 69830268 T2 | 1/2006 |
| DE | 102009027387 A1 | 1/2011 |
| EP | 1843443 A2 | 10/2007 |
| EP | 1529328 B1 | 9/2009 |
| EP | 1914162 B1 | 6/2010 |
| EP | 2249393 A1 | 11/2010 |
| GB | 2487918 A | 8/2012 |
| JP | 10285966 A | 10/1998 |
| WO | 2006089904 A1 | 8/2006 |
| WO | 2008055493 A1 | 5/2008 |
| WO | 2010003835 A2 | 1/2010 |
| WO | 2010015334 A1 | 2/2010 |
| WO | 2011012174 A1 | 2/2011 |
| WO | 2012119645 A1 | 9/2012 |
| WO | 2012123014 A2 | 9/2012 |
| WO | 2012143245 A1 | 10/2012 |
| WO | 2013174726 A1 | 11/2013 |

OTHER PUBLICATIONS

Haj-Maharsi, Mohamed Y, "Novel DC Ring Topology and Protection System—a Comprehensive Solution for Mega City Power Grids", Ph.D. Dissertation, North Carolina State University, Department of Electrical Engineering, 2009, pp. 1-258.

Karlsson, Per et al., "Fault Detection and Clearance in DC Distributed Power Systems", Nordic Workshop on Power and Industrial Electronics. NORPIE/2002. Aug. 12-14, 2002. pp. 1-6.

Mahajan, Nikhil R., "System Protection for Power Electronic Building Block Based DC Distribution Systems", Ph.D. Dissertation, North Carolina State University, Dept. of Electrical Computer Engineering. Dec. 7, 2004. pp. 1-135.

Salonen, Pasi et al., "Protection Scheme for an LVDC Distribution System", 20th International Conference and Exhibition on Electricity Distribution—Part 1, 2009, CIRED 2009, Jun. 8-11, 2009, pp. 1-4, Prague, Czech Republic.

Barker, Carl, "HVDC as bulk power transfer system", Supergen Wind 5th Training Seminar, Mar. 2011, 1-47.

Tang, Lianxiang et al., "Locating and Isolating DC Faults in Multi-Terminal DC Systems", IEEE Transactions on Power Delivery, vol. 22, No. 3, Jul. 2007, 1877-1884.

* cited by examiner

PROTECTION DEVICE FOR DC COLLECTION SYSTEMS

TECHNICAL FIELD

The instant application relates to DC collection systems with renewable energy resources, and more particularly to protection devices for such DC collection systems.

BACKGROUND

Renewable energy resources, such as wind and solar, are becoming more widely utilized. DC collection systems can be used to collect power from individual renewable energy resources and transmit the collected power to a utility system. Depending on the type of renewable energy resource, converters at the renewable energy sources can be AC/DC rectifiers or DC/DC inverters. Power generated from the energy sources is collected by feeders and then aggregated at a grid interface station for further power conversion and voltage transformation.

Due to small resistance and lack of inductance, when a DC fault occurs, the rate of rise of DC fault current is quite fast and the peak fault current is typically much higher than nominal current. The fast rate of rise of DC fault current creates difficulties for fault isolation, and high DC fault current may damage equipment in the DC collection system. There exist different protection strategies for DC systems. Most depend on DC circuit breakers, which are expensive.

In another conventional approach for an HVDC (high-voltage DC) system transmitting electrical power from a DC to AC network through a voltage source converter (VSC), diodes are placed in series with the VSC on either the positive or negative DC line in unipolar or bipolar configurations. When there is a fault on the DC line, the fault current is limited or interrupted. From the HVDC classic rectifier side, the polarity of the DC voltage can be reversed by the controllable rectifiers. From the VSC inverter side, the series diode blocks the fault current flow from the AC network to the fault location on the DC line. However, blocking all fault-current contributing converters with series diodes is not a desirable protection solution for a multi-terminal DC power system such as DC collection systems for renewable resources due to widespread impacts of the fault on the entire DC system. Another conventional protection device for DC collections system includes a controller for detecting and isolating faults. A probe power unit is also provided to determine whether a fault persists after fault isolation, and to enable reconnection of the isolated segment if the fault is removed. In this case, the protection device implementation is nontrivial and adds significant cost to the DC collection system.

SUMMARY

According to the embodiments described herein, protection of DC collection systems is provided. Unidirectional DC protection devices are implemented with a diode, a fast no-load switch and a low-capacity charging switch. The unidirectional DC protection devices are placed at particular locations within a DC collection system to minimize outage risk caused by faults on feeders of the DC collection system. The arrangement of the DC protection devices together with corresponding protection measures and procedures yields fast protection and high system reliability of the protected DC distribution system at different operating conditions. The unidirectional DC protection devices described herein are low cost, have simple operating principals, and provide fast fault isolation due to natural diode reverse blocking.

According to an embodiment of a DC collection system, the system comprises a plurality of DC feeders for transferring power generated from energy sources to an AC grid interface and a plurality of protection devices for isolating the energy sources from faults on the DC feeders. Each protection device comprises a diode having its forward direction in the power flow to the AC grid interface, a first switch in parallel with the diode, a second switch in series with the diode, and a control unit. The control unit is operable to open the first switch so that current can flow through the diode in the forward direction without the first switch bypassing the diode, and close the first switch if no current is flowing through the diode in the forward direction and power is needed upstream of the diode. The control unit is further operable to close the second switch so that current can flow through the diode in the forward direction to the AC grid interface, and open the second switch if no current is flowing through the diode in the forward direction due to a fault in a DC feeder to which the protection device is coupled.

According to an embodiment of a method of transferring power from the DC collection system to an AC grid, the method comprises: opening the first switch of one of the protection devices so that current can flow through the diode of that protection device in the forward direction without the first switch bypassing the diode; closing the first switch of one of the protection devices if no current is flowing through the diode of that protection device in the forward direction and power is needed upstream of the diode; closing the second switch of one of the protection devices so that current can flow through the diode of that protection device in the forward direction to the AC grid interface; and opening the second switch of one of the protection devices if no current is flowing through the diode of that protection device in the forward direction due to a fault in a DC feeder to which the protection device is coupled.

According to an embodiment of a protection device for a DC collection system, the protection device comprises a diode having its forward direction in a normal power flow of a region of the DC collection system, a first switch in parallel with the diode, a second switch in series with the diode, and a control unit. The control unit is operable to open the first switch so that current can flow through the diode in the forward direction without the first switch bypassing the diode, and close the first switch if no current is flowing through the diode in the forward direction and power is needed upstream of the diode. The control unit is further operable to close the second switch so that current can flow through the diode in the forward direction to an AC grid interface of the DC collection system, and open the second switch if no current is flowing through the diode in the forward direction due to a fault in a DC feeder to which the protection device is coupled.

Those skilled in the art will recognize additional features and advantages upon reading the following detailed description, and upon viewing the accompanying drawings.

BRIEF DESCRIPTION OF THE DRAWINGS

The components in the figures are not necessarily to scale, instead emphasis being placed upon illustrating the principles of the invention. Moreover, in the figures, like reference numerals designate corresponding parts. In the drawings.

DETAILED DESCRIPTION

Figure 1:
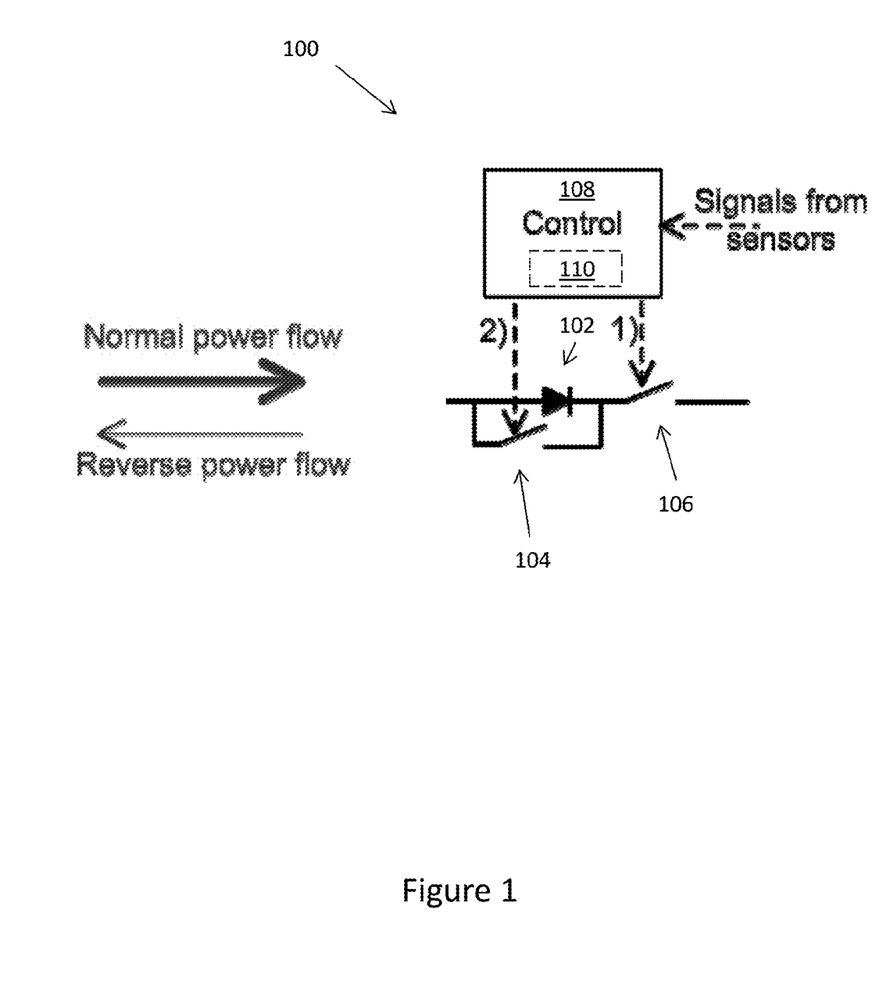
FIG. 1 illustrates a block diagram of an embodiment of a protection device for a DC collection system.

FIG. 1 illustrates an embodiment of a unidirectional DC protection device 100 for DC collection systems. The protection device 100 includes a diode 102 arranged with its forward direction in the normal power flow of a region of a DC collection system in which the protection device 100 is to be deployed. The normal power flow direction is from the power generation side of the DC collection system toward the AC grid interface side. Various deployment embodiments for the protection device 100 in a DC collection system are described in more detail later herein. Any standard power diode can be used as the diode 102 of the protection device 100.

The protection device 100 also includes a charging switch 104 in parallel with the diode 102 and an isolation switch 106 in series with the diode 102. The charging switch 104 commutates a small current upstream of the diode 102 in the reverse power flow direction i.e. from the AC grid interface side toward the power generation side of the DC collection system. The small current commutated by the charging switch 104 in the reverse power flow direction enables charging at the power generation side of the DC collection system e.g. during start-up. The charging switch 104 can be a mechanical switch or a semiconductor switch since the charging switch 104 commutates a small reverse current e.g. 20% or less of the normal current. Such a small reverse current would otherwise be blocked by the diode 102 if the charging switch 104 were omitted from the protection device 100. The isolation switch 106 of the protection device 100 can be placed at either side of the diode 102, and provides safe isolation of the protected circuit from the rest of the DC collection system in which the protection device 100 is deployed. The isolation switch 106 is a mechanical switch designed to handle rated current in the normal power flow direction when closed, and to provide galvanic isolation when opened during a fault.

The protection device 100 further includes a control unit 108 for controlling the switching state (opened/closed) of the charging and isolation switches 104, 106. The state of the switches 104, 106 is controlled based on signals received from sensors and/or other state information for the DC collection system in which the protection device 100 is deployed. For example, a current sensor 110 for sensing current in the region of the DC collection system protected by the protection device 100 can be remote or collocated with the control unit 108 as indicated by the dashed box in FIG. 1. In either case, the on/off state of the isolation switch 106 can be based on the sensed current and the on/off state of the charging switch 104 can be based on the operational status of the DC collection system (normal operation, charging/start-up, etc.).

In general, the control unit 108 issues control commands 1), 2) to open/close the isolation switch 106 and the charging switch 104. For example during normal operation, if a reverse voltage is applied across the diode 102 due to a fault on a feeder section protected by the protection device 100, normally less than a few microseconds is needed for the diode 102 to automatically turn off i.e. stop conducting in the forward direction. If the current sensor 110 detects zero current flowing through the diode 102, a control command 1) can be sent to open the isolation switch 106. Since the time duration required for the diode 102 to turn on/off can be neglected, the action time of the isolation switch 106 determines the operation time of the unidirectional DC protection device 100.

Figure 2:
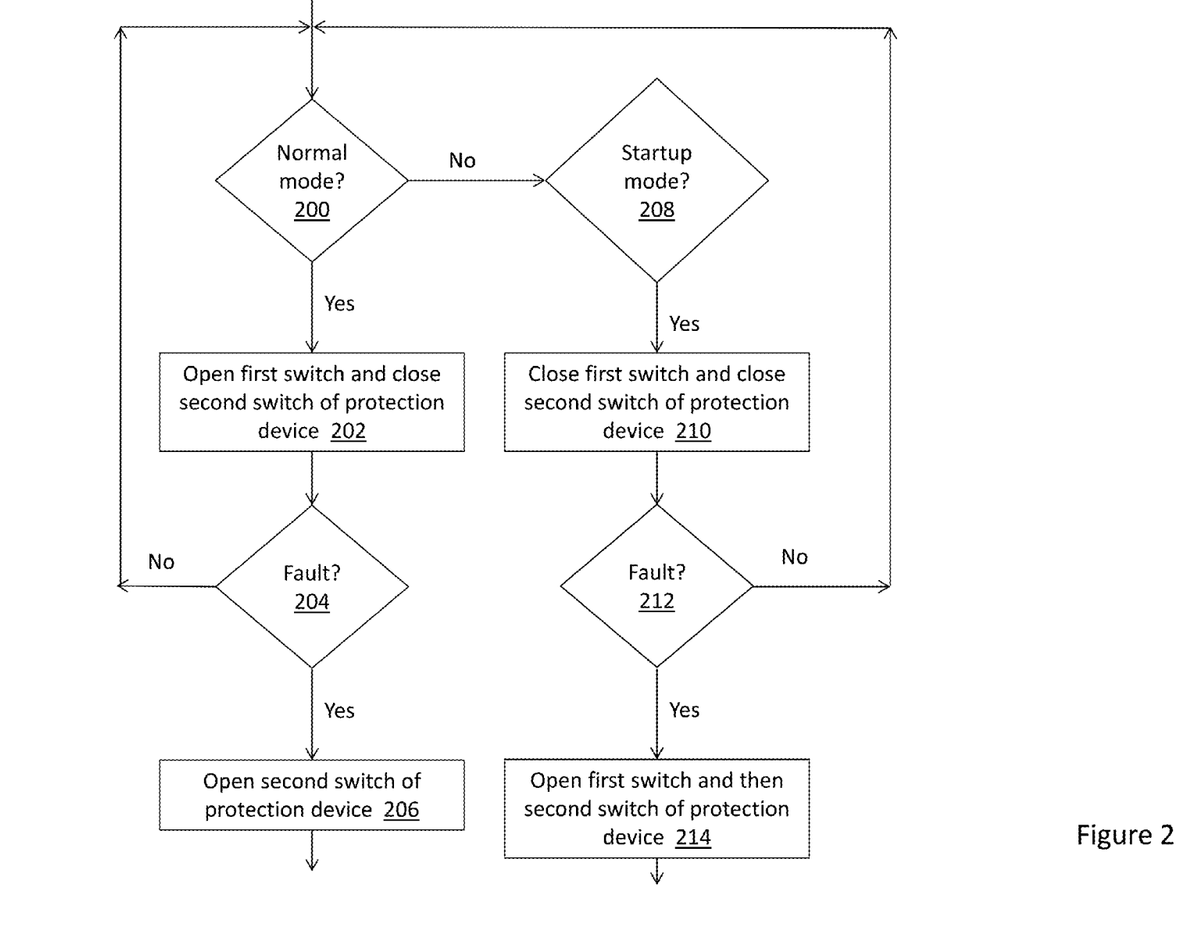
FIG. 2 illustrates a flow diagram of an embodiment of a method of transferring power from a DC collection system to an AC grid.

FIG. 2 illustrates an embodiment of a method of controlling the switching state of the charging and isolation switches 104, 106 by the control unit 108 of the unidirectional DC protection device 100. If the DC collection system is in normal operation i.e. generating power with no faults and not in startup mode (Block 200), the control unit 108 opens the charging switch 104 and closes the isolation switch 106 (Block 202). The charging switch 104 is opened so that current can flow through the diode 102 in the forward direction without the charging switch 104 bypassing the diode 102. As a result, the charging switch 104 in parallel with the diode 102 is open and a large amount of power can flow through the diode 102 in the forward (normal power flow) direction. The isolation switch 106 is closed in normal operation so that current can flow through the diode 102 in the forward direction to an AC grid interface of the DC collection system without being blocked by the isolation switch 106. If a fault such as a pole-to-pole fault or pole-to-ground fault occurs during normal operation in the region of the DC collection system protected by the protection device 100 and no current is flowing through the diode 102 in the forward direction due to the fault (Block 204), the control unit 108 opens the isolation switch 106 (Block 206). In one embodiment, a current sensor 110 included in or associated with the control unit 108 senses the current flowing through the diode 102 in the forward direction and the control unit 108 opens the isolation switch 106 responsive to the current sensor 110 indicating no current is flowing through the diode 102. In this state, the isolation switch 106 provides galvanic isolation of the protected circuit from the rest of the DC collection system.

If the DC collection system is in startup mode with no faults i.e. preparing to generate and deliver power (Block 208), the control unit 108 closes the charging switch 104 and closes the isolation switch 106 (Block 210). The charging switch 104 is closed if no current is flowing through the diode 102 in the forward direction and power is needed upstream of the diode 102. For example to charge cables and/or start-up wind turbines of a DC collections system, the charging switch 104 can be closed to permit a small amount of power to flow in the reverse direction. The isolation switch 106 is closed in the startup mode so that reverse current can flow through the protection device 100 toward the generation side without being blocked by the isolation switch 106. In one embodiment, the control unit 108 closes the charging switch 104 and the isolation switch 106 responsive to a startup command that indicates power is needed upstream of the diode 102 in the opposite direction as the normal power flow. If a fault occurs during startup mode in the region of the DC collection system protected by the protection device 100 (Block 212), the control unit 108 opens the charging switch 104 and then opens the isolation switch 106. In the startup mode, the diodes 102 of the startup feeder are bypassed by charging switches 104. If a fault occurs, the fault will be cleared by AC breaker 408 in FIG. 4.

Figure 3:
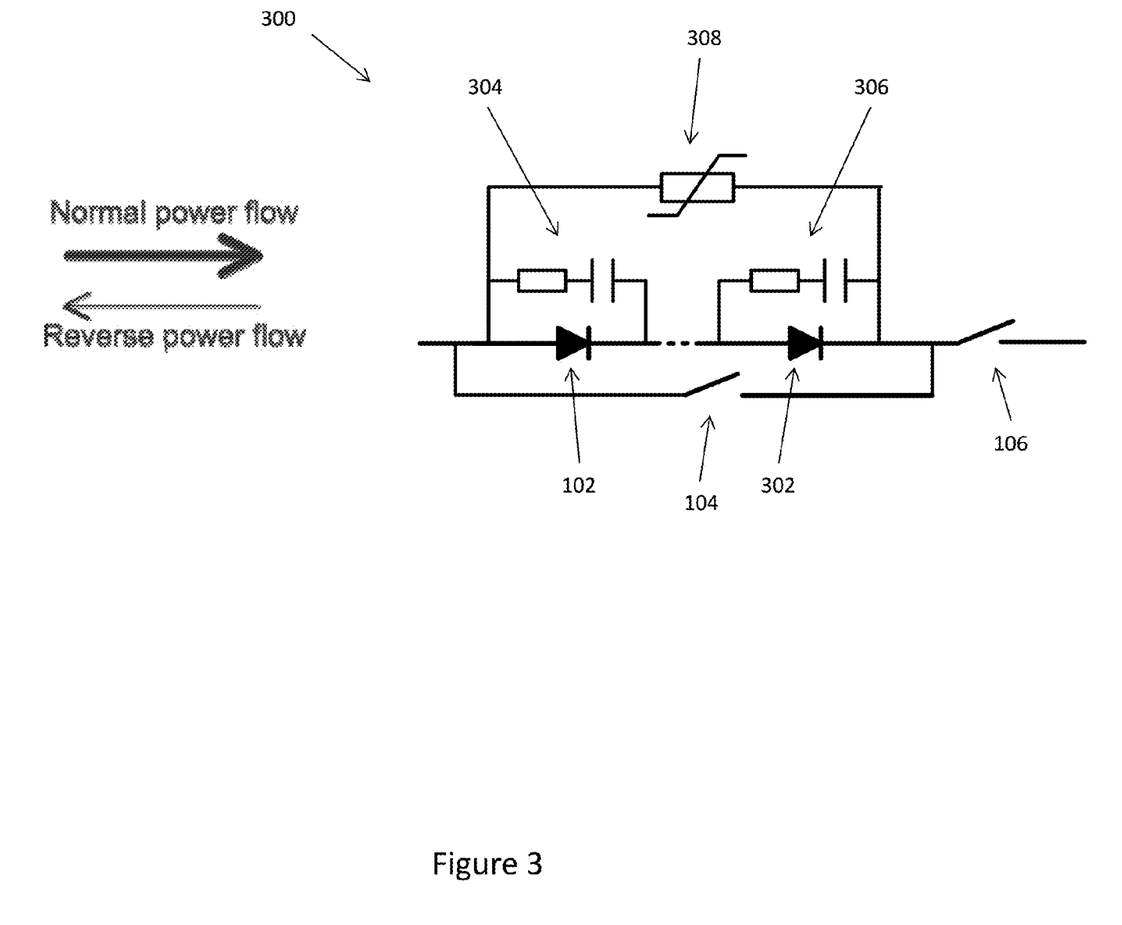
FIG. 3 illustrates a block diagram of another embodiment of a protection device for a DC collection system.

FIG. 3 illustrates another embodiment of a unidirectional DC protection device 300 for DC collection systems. The embodiment shown in FIG. 3 is similar to the embodiment shown in FIG. 1. However, the protection device 300 further comprises at least one additional diode 302 in series with the first diode 102. Each diode 102, 302 has its forward direction in the normal power flow. The charging switch 104 is in parallel with the series-connected diodes 102, 302 and the isolation switch 106 is in series with the series-connected diodes 102, 302. An RC snubber circuit 304, 306 can be connected in parallel with each of the diodes 102, 302 for providing dynamic voltage sharing. A surge arrester 308 can be connected in parallel with the series-connected diodes 102, 302 for preventing overvoltage due to energy oscillations between fault inductance and system capacitance. Any standard RC snubber circuit and surge arrester can be used in the protection device. The control unit for the switches 104, 106 of the protection device 300 is not shown in FIG. 3 for ease of illustration, but has the same functionality as the control unit 108 for the protection device 100 of FIG. 1.

Figure 4:
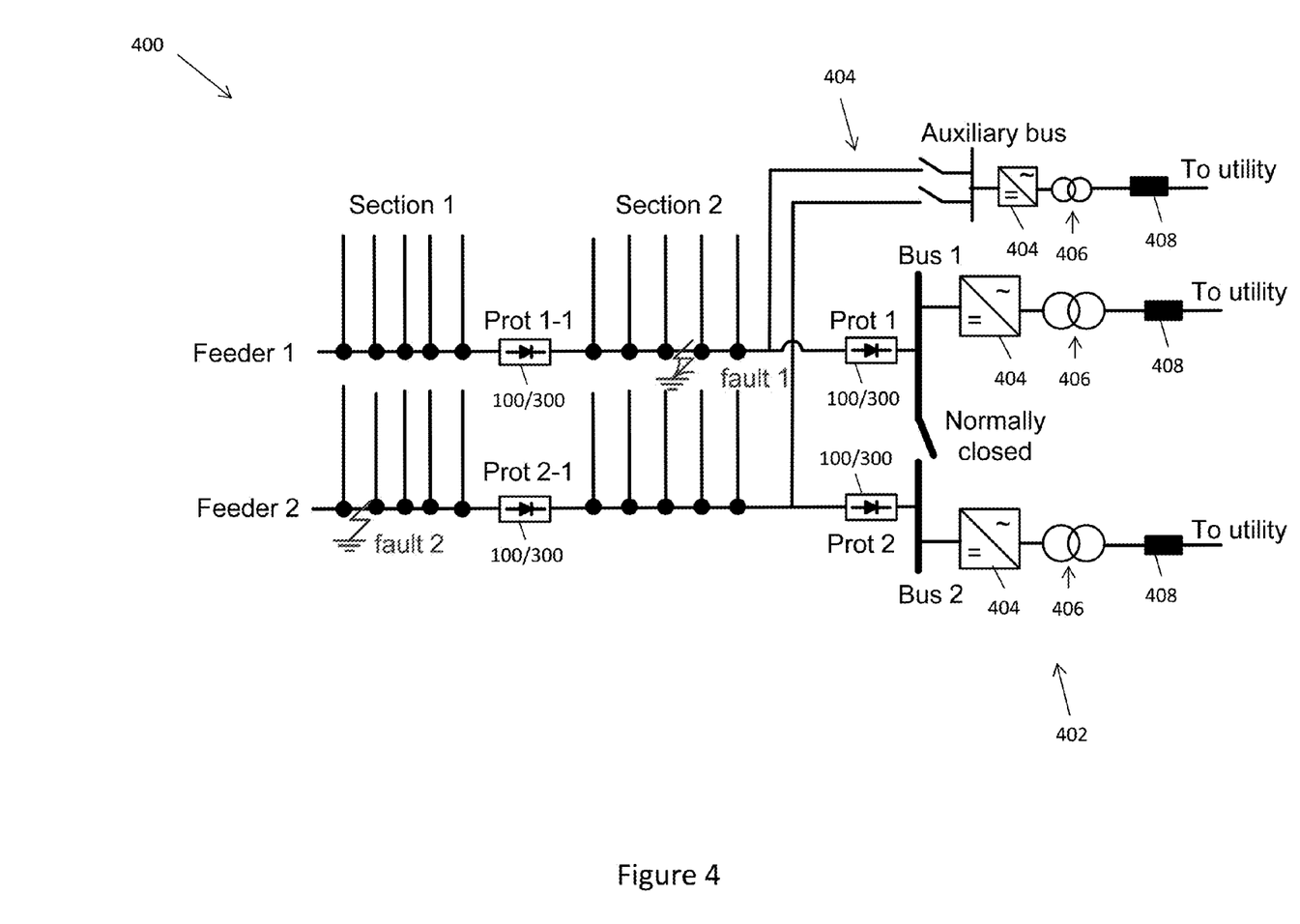
FIG. 4 illustrates a block diagram of an embodiment of multiple unidirectional DC protection devices arranged in a DC collection system having a radial feeder configuration.

FIG. 4 shows the arrangement of multiple instances of the unidirectional DC protection device 100/300 in a radial feeder DC wind farm collection system 400. The DC collection system 400 includes DC feeders ('Feeder 1' and 'Feeder 2' in FIG. 4) for transferring power generated from energy sources to an AC grid interface. The energy sources (e.g. wind turbines in this case) are not shown in FIG. 4 for ease of illustration. Two feeders are shown in FIG. 4 for ease of illustration and explanation, but in general the DC collection system 400 can include any number of feeders.

The feeders provide connections to the buses ('Bus 1' and 'Bus 2' in FIG. 4) of the DC collection system 400, which in turn are connected to an AC grid interface 402 of the system 400. The AC grid interface 402 can include DC/AC converters 404, transformers 406, circuit breakers 408, etc. and provides further power conversion and voltage transformation for the power aggregated at the grid interface 402 from the feeders. The protection devices 100/300 isolate the energy sources from faults on the DC feeders. At least some of the protection devices 100/300 connect the DC feeders to a DC bus that in turn connects the DC feeders to the AC grid interface 402.

To improve system reliability, one or more of the DC feeders can be protected by at least two of the protection devices 100/300 so that each DC feeder has at least two separately isolatable sections (e.g. 'Section 1' and 'Section 2' in FIG. 4). For example, a unidirectional DC protection device 100/300 can be provided for each feeder ('Prot 1' and 'Prot 2' in FIG. 4) and for each feeder section ('Prot 1-1' and 'Prot 2-1' in FIG. 4). In this arrangement, feeder DC protection devices 'Prot 1' and 'Prot 2' protect the wind farm from faults between the collection bus and the second section ('Section 2') of the first and second feeders, as well as faults in the second section of each feeder. Section DC protection devices 'Prot 1-1' and 'Prot 2-1' protect the wind farm from faults in the first section ('Section 1') of each feeder. In case of failure of section DC protection device 'Prot 1-1' and 'Prot 2-1', feeder DC protection devices 'Prot 1' and 'Prot 2' protect the wind farm from any faults on the feeders.

If there is a fault ('fault 1' in FIG. 4) in the second section on the first feeder, no current can flow through feeder DC protection device 'Prot 1' and the isolation switch 106 of feeder DC protection device 'Prot 1' can be opened. All wind turbines connected to the first feeder are isolated from the rest of the DC wind farm. The rest of the wind farm thus continues operation without interruption. The converter or AC circuit breaker of each wind turbine connecting to the first feeder can interrupt fault current. The current flow directions measured at different wind turbines can be analyzed locally and communicated with neighboring wind turbines. In this way, correct fault location can be determined. Further measures can be taken to remove 'fault 1' or minimize the impacts of 'fault 1', and resume normal operation of the first feeder with most unaffected wind turbines.

At normal operation, if there is fault ('fault 2' in FIG. 4) in the first section ('Section 1') of the second feeder, no current flows through section DC protection device 'Prot 2-1' due to reverse blocking of the diode 102 and the wind turbines in the second section of the second feeder are not affected. Since no current flow through section DC protection device 'Prot 2-1', the isolation switch 106 of section DC protection device 'Prot 2-1' can be commanded to open. The wind turbines in the first section of the second feeder are thus isolated from the rest of the wind farm. The fault location, fault removal and system recovery measures are the same as mentioned above when there is a fault in the second section ('Section 2') of the first feeder.

At certain start-up modes of operation, when components such as cables, converter capacitors and auxiliary circuits in a wind farm need initial charging, the isolation switches 106 and the charging switches 104 of the unidirectional DC protection devices 100/300 can be closed to enable reverse power flow from the AC grid interface 402 to the power generation side of the DC collection system 400. To provide feeder protection during start-up operation, an auxiliary bus 404 can be provided in parallel with the collection buses ('Bus 1' and 'Bus 2' in FIG. 4). The auxiliary bus 404 can be switched to connect to different feeders with the feeder DC protection devices 100/300 bypassed. For example during start-up operation of the first feeder, the auxiliary bus 404 can be connected only to the first feeder and disconnected from the other feeders. On the first feeder, the charging switch 104 of section DC protection device 'Prot 1-1' is closed to allow reverse charging current flow and the charging switch 104 of feeder DC protection device 'Prot 1' is open. If 'fault 1' occurs during the charging process, a circuit breaker 408 at the utility side of the auxiliary bus 404 can respond to the fault and open in response. With the diode 102 of feeder DC protection device 'Prot 1' blocking reverse power flow, the rest of the wind farm is not affected by 'fault 1' on the first feeder.

Figure 5:
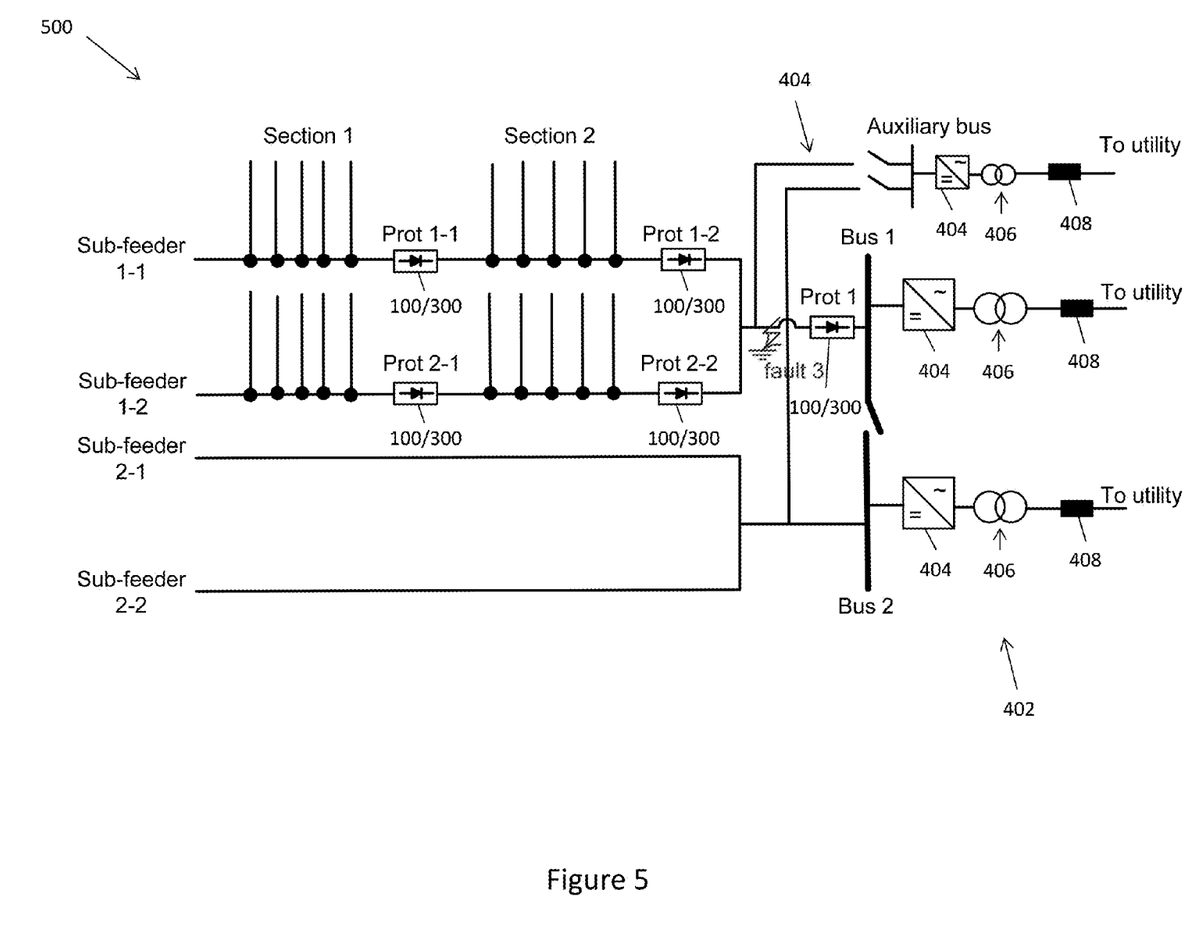
FIG. 5 illustrates a block diagram of an embodiment of multiple unidirectional DC protection devices arranged in a DC collection system having a radial feeder configuration with sub-feeders.

FIG. 5 shows the arrangement of multiple instances of the unidirectional DC protection device 100/300 in a DC wind farm collection system 500 having a bifurcated radial feeder configuration. At least some of the DC feeders are divided in to at least two different DC sub-feeders. As shown in FIG. 5, the first feeder is split into 'sub-feeder 1-1' and 'sub-feeder 1-2' and the second feeder is split into 'sub-feeder 2-1' and 'sub-feeder 2-2'. The DC collection system can include any desired number of feeders and sub-feeders. Each of the DC sub-feeders is protected by at least two of the protection devices 100/300 so that each DC sub-feeder has at least two separately isolatable sections ('Section 1' and 'Section 2' in FIG. 5). The protection of any faults on the sub-feeders is the same as in the radial feeder configuration previously described herein. However, when 'fault 3' occurs on the first feeder, all wind turbines on the first feeder have to be isolated from the rest of the wind farm by the feeder DC protection device 'Port 1'.

Figure 6:
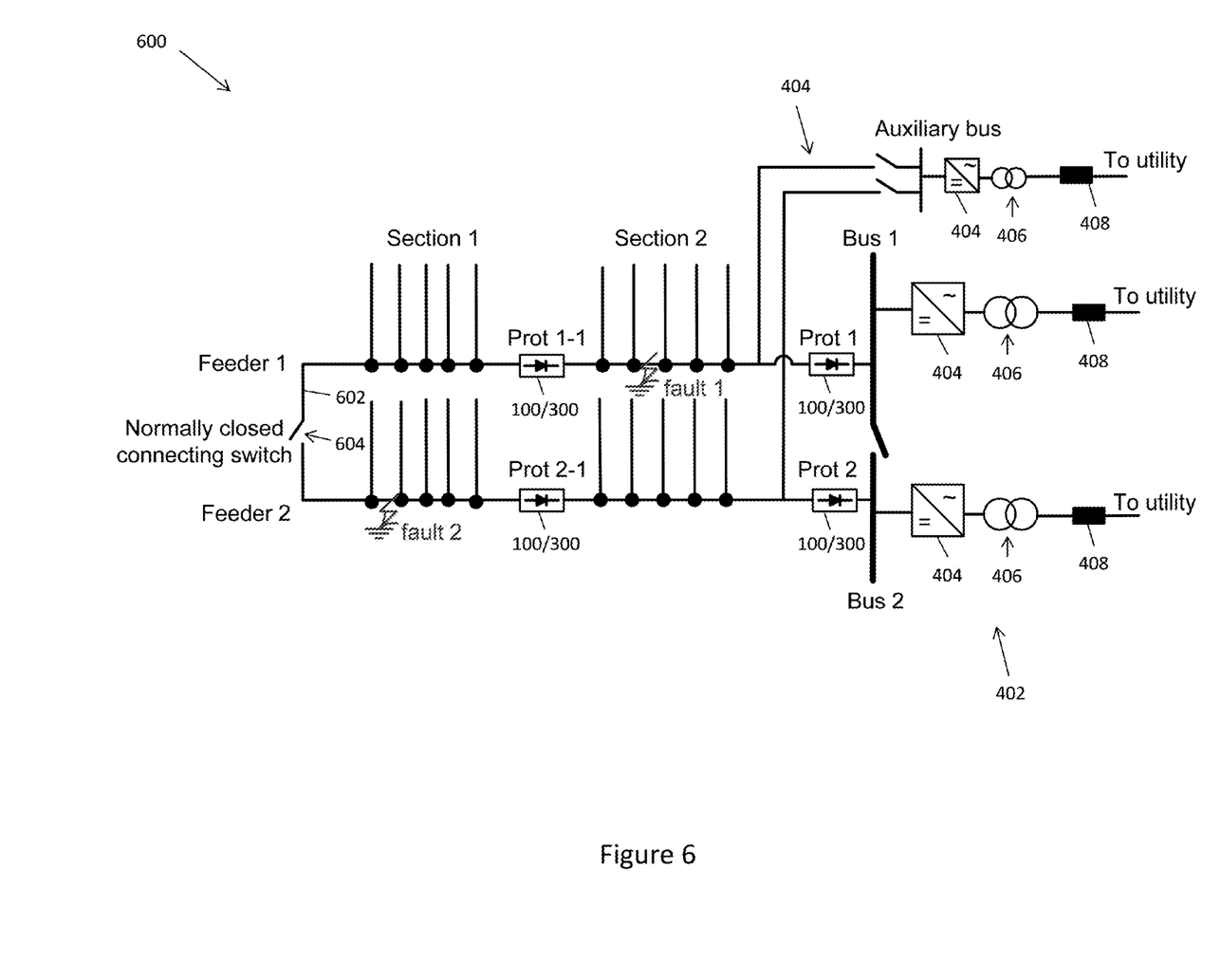
FIG. 6 illustrates a block diagram of an embodiment of multiple unidirectional DC protection devices arranged in a DC collection system having a ring feeder configuration.

FIG. 6 shows the arrangement of multiple instances of the unidirectional DC protection device 100/300 in a DC wind farm collection system 600 having a ring configuration. In FIG. 6, the ends of the first and second DC feeders are connected together by a connecting cable 602 through a connecting switch 604. The connecting switch 604 can be normally closed or opened depending on different system operation strategies. The arrangement of the unidirectional DC protection devices 100/300 in a normally-closed ring DC wind farm collection system 600 is shown in FIG. 6. At normal operation, low current flows through the connecting cable 602 between the two feeders. If 'fault 1' occurs, both feeder DC protection device 'Prot 1' and feeder DC protection device 'Prot 2-1' can be opened since no current flows through the respective diodes 102. The wind turbines in the second section of the second feeder are not affected. The converter or circuit breaker of each wind turbine on the affected sections interrupts the fault current. After 'fault 1' is located, further measures can be taken to remove 'fault 1' or minimize the impacts of 'fault 1', and resume the normal operation of most unaffected wind turbines. The wind turbines upstream of 'fault 1' in the first section ('Section 1') of the first feeder therefore can continue to supply power through the second feeder through the connecting cable 602.

At normal operation and if 'fault 2' occurs, both section DC protection device 'Prot 1-1' and section DC protection device 'Prot 2-1' see no current and can be opened. The wind turbines in the second sections of both the first feeder and the second feeder are not affected. The converter or circuit breaker of each wind turbine on the affected sections interrupts the fault current. After 'fault 2' is located, further measures can be taken to remove 'fault 2' or minimize the impacts of 'fault 2', and resume the normal operation of most unaffected wind turbines.

If the connecting switch 604 is normally open instead of closed, the opening process for the DC protection devices 100/300 is the same as in the radial configuration previously described herein in connection with FIG. 4. After a fault is located and isolated, the connecting switch 604 can be closed to resume the normal operation of most unaffected wind turbines.

Compared to the radial and bifurcated radial feeder configurations previously described herein, the ring configuration can improve system reliability. If there is a fault in the second section ('Section 2') of either feeder, instead of stopping power supply from all wind turbines on the faulted feeder, the wind turbines in the first section ('Section 1') on the faulted feeder can still supply power through the connecting cable 602 and the healthy (non-faulty) feeder. That is, the isolation switch 106 of the protection devices 100/300 located on each side of the fault on one of the DC feeders is opened during the fault so that each section of the feeder upstream of the fault transfers power to another one of the DC feeders during the fault by the cable 602 connecting the DC feeders through the connecting switch 604.

Figure 7:
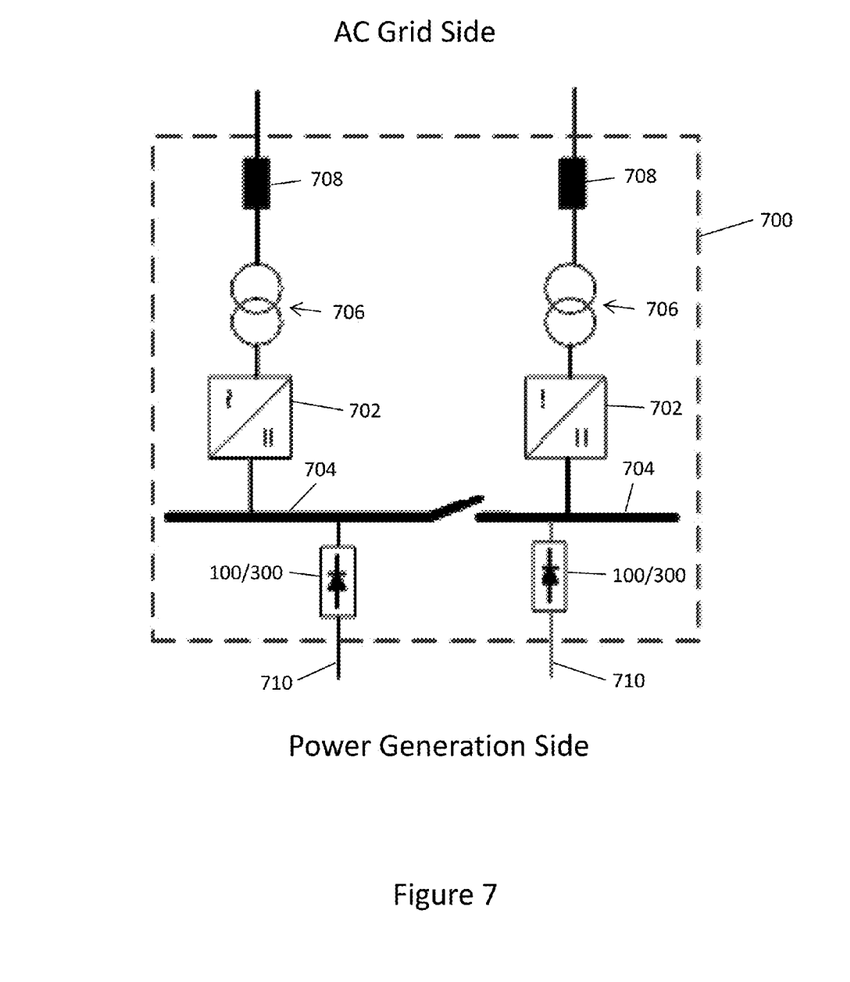
FIG. 7 illustrates a block diagram of an embodiment of a feeder protection device included in a substation of a DC collection system.

FIG. 7 illustrates the installation of the feeder DC protection devices 100/300 in a substation 700 of a DC collection system. The substation 700 includes DC/AC converters 702 coupled to buses 704 of a DC collection system, transformers 706 and circuit breakers 708 such as air case circuit breakers. Feeder DC protection devices 100/300 (e.g. 'Prot 1' and 'Prot 2' in FIGS. 4-6) connect the ends of the DC feeders 710 to the corresponding buses 704 of the DC collection system. According to one embodiment, the feeder DC protection devices 100/300 that connect the feeders 710 to the DC buses 704 of the DC collections system are disposed within the substation 700.

Figure 8:
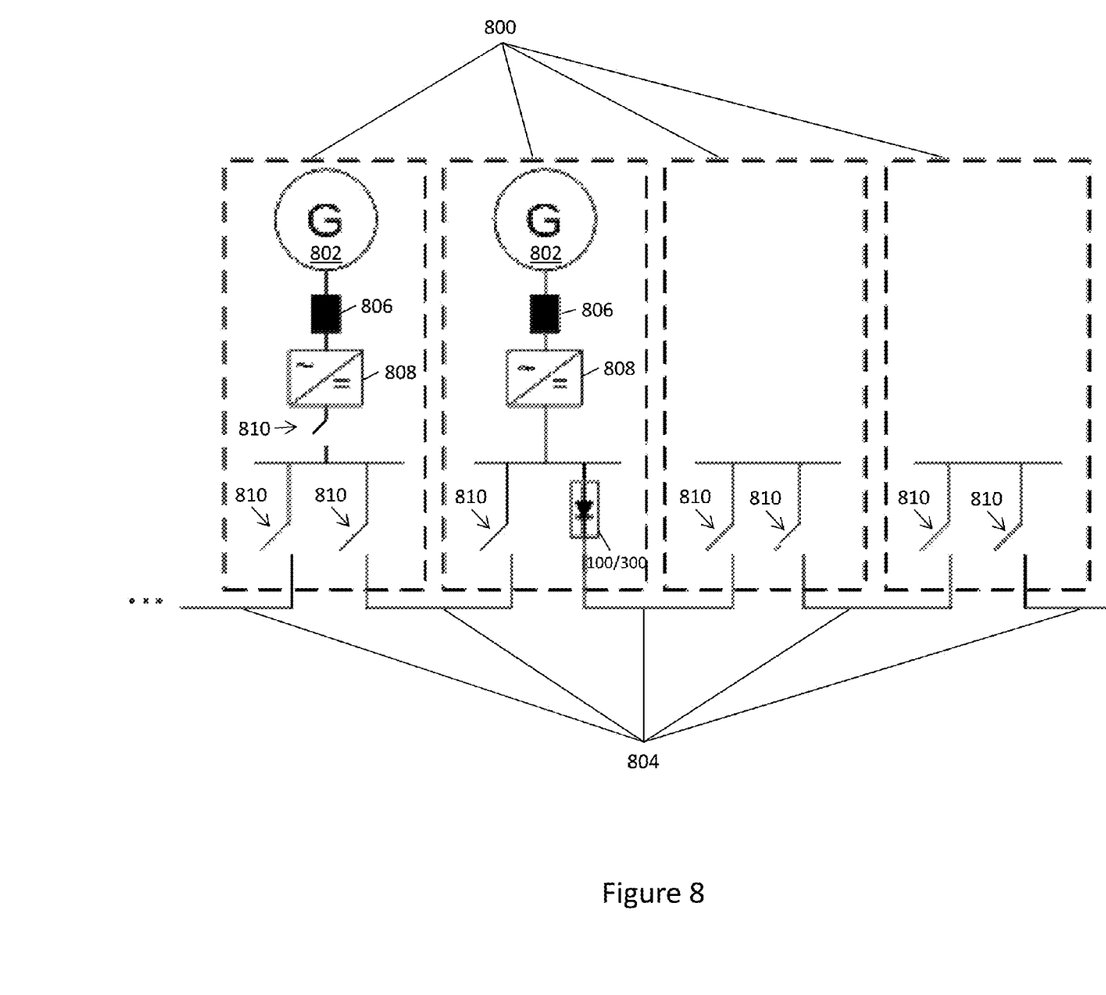
FIG. 8 illustrates a block diagram of an embodiment of a section protection device included in an energy system of a DC collection system.

FIG. 8 illustrates the installation of the section DC protection devices 100/300 in the energy sources 800 of a DC collection system. The energy sources 800 include generators 802 like wind turbines, tidal generators, diesel generators, distributed energy sources, solar arrays, etc. coupled to DC feeders 804 of the DC collection system. The energy sources 800 can further include components such as circuit breakers 806, AC/DC inverters 808, switches 810, etc. for coupling the generators 802 the DC feeders 804. Section DC protection devices 100/300 (e.g. 'Prot 1-1', 'Prot 1-2', 'Prot 2-1', and 'Prot 2-2' in FIGS. 4-6) connect the energy sources 800 to the DC feeders 804. According to one embodiment, the section DC protection devices 100/300 that connect the energy sources 800 to the DC feeders 804 are disposed within the energy sources 800 e.g. housed in wind towers that generate power from wind energy.

Previously described herein are various embodiments of the arrangement of the unidirectional DC protection devices 100/300 in different types of DC collection systems with different configurations. The unidirectional DC protection devices 100/300 can be deployed in any type of DC collection system (high voltage, medium voltage, etc.) having any configuration (radial, ring, etc.), and the DC collection system can include any type of energy sources (renewable such as wind, solar, tidal, etc., gas, diesel, bio-diesel, etc.). The unidirectional DC protection devices 100/300 each include a diode 102, a fast no-load switch 106 and a low-capacity charging switch 104, and are placed at particular locations within the DC collection system to minimize outage risk caused by faults on feeders of the DC collection system.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A DC collection system, comprising:
a plurality of DC feeders for transferring power generated from energy sources to an AC grid interface;
a plurality of protection devices for isolating the energy sources from faults on the DC feeders, each protection device comprising a diode having its forward direction in the power flow to the AC grid interface, a first switch in parallel with the diode, a second switch in series with the diode, and a control unit operable to:
open the first switch so that current can flow through the diode in the forward direction without the first switch bypassing the diode, and close the first switch if no current is flowing through the diode in the forward direction and power is needed upstream of the diode; and
close the second switch so that current can flow through the diode in the forward direction to the AC grid interface, and open the second switch if no current is flowing through the diode in the forward direction due to a fault in a DC feeder to which the protection device is coupled; and a plurality of current sensors each operable to sense the current flowing through one of the diodes in the forward direction, wherein the control unit of each protection device is operable to open the second switch responsive to the corresponding current sensor indicating no current is flowing through the diode in the forward direction.

2. The DC collection system of claim 1, wherein at least some of the protection devices connect the DC feeders to a DC bus that connects the DC feeders to the AC grid interface.

3. The DC collection system of claim 2, wherein the AC grid interface comprises a substation operable to convert DC power collected from the plurality of DC feeders to AC power, and wherein the protection devices that connect the DC feeders to the DC bus are disposed within the substation.

4. The DC collection system of claim 1, wherein at least some of the energy sources are wind towers that generate power from wind energy, and wherein the protection devices that connect the DC feeders to the wind towers are disposed within the respective wind towers.

5. The DC collection system of claim 1, wherein the DC feeders are protected by at least two of the protection devices so that each DC feeder has at least two separately isolatable sections.

6. The DC collection system of claim 5, wherein the DC feeders are arranged in a radial configuration, and wherein the second switch of the protection device located downstream of a fault on one of the DC feeders is opened during the fault so that each section of the DC feeder downstream of the protection device with the opened second switch continues to transfer power to the AC grid interface.

7. The DC collection system of claim 5, wherein the DC feeders are arranged in a ring configuration, and wherein the second switch of the protection devices located on each side of a fault on one of the DC feeders is opened during the fault so that each section of the feeder upstream of the fault transfers power to another one of the DC feeders during the fault by a cable connecting the DC feeders through a connecting switch.

8. The DC collection system of claim 5, wherein at least some of the DC feeders are divided in to at least two different DC sub-feeders, and wherein each of the DC sub-feeders is protected by at least two of the protection devices so that each DC sub-feeder has at least two separately isolatable sections.

9. The DC collection system of claim 1, further comprising an auxiliary bus operable to connect at least some of the DC feeders to the AC grid interface during a startup mode in which power is required to flow upstream in the opposite direction as the normal power flow.

10. The DC collection system of claim 9, wherein the control unit of each protection device coupled to the auxiliary bus is operable to close the first switch and the second switch responsive to a startup command that indicates the DC collection system is in the startup mode.

11. The DC collection system of claim 1, wherein the current sensors are collocated with the respective protection devices.

12. A protection device for a DC collection system, the protection device comprising:
a diode having its forward direction in a normal power flow of a region of the DC collection system;
a first switch in parallel with the diode;
a second switch in series with the diode;
a control unit operable to:
open the first switch so that current can flow through the diode in the forward direction without the first switch bypassing the diode, and close the first switch if no current is flowing through the diode in the forward direction and power is needed upstream of the diode; and
close the second switch so that current can flow through the diode in the forward direction to an AC grid interface of the DC collection system, and open the second switch if no current is flowing through the diode in the forward direction due to a fault in a DC feeder to which the protection device is coupled; and
a current sensor operable to sense the current flowing through the diode in the forward direction,
wherein the control unit is operable to open the second switch responsive to the current sensor indicating no current is flowing through the diode in the forward direction.

13. The protection device of claim 12, wherein the control unit is operable to close the first switch and the second switch responsive to a startup command that indicates a startup mode in which power is needed upstream of the diode in the opposite direction as the normal power flow.

14. The protection device of claim 12, further comprising at least one additional diode in series with the diode and each diode having its forward direction in the normal power flow, and wherein the first switch is in parallel with the series-connected diodes and the second switch is in series with the series-connected diodes.

15. The protection device of claim 14, further comprising an RC snubber circuit in parallel with each of the diodes.

16. The protection device of claim 14, further comprising a surge arrester in parallel with the series-connected diodes.

17. The protection device of claim 12, wherein the first and the second switches are both mechanical switches.

18. A DC collection system, comprising:
a plurality of DC feeders for transferring power generated from energy sources to an AC grid interface;
a plurality of protection devices for isolating the energy sources from faults on the DC feeders, each protection device comprising a diode having its forward direction in the power flow to the AC grid interface, a first switch in parallel with the diode, a second switch in series with the diode, and a control unit operable to:
open the first switch so that current can flow through the diode in the forward direction without the first switch bypassing the diode, and close the first switch if no current is flowing through the diode in the forward direction and power is needed upstream of the diode; and
close the second switch so that current can flow through the diode in the forward direction to the AC grid interface, and open the second switch if no current is flowing through the diode in the forward direction due to a fault in a DC feeder to which the protection device is coupled; and
an auxiliary bus operable to connect at least some of the DC feeders to the AC grid interface during a startup mode in which power is required to flow upstream in the opposite direction as the normal power flow.

19. The DC collection system of claim 18, wherein the control unit of each protection device coupled to the auxiliary bus is operable to close the first switch and the second switch responsive to a startup command that indicates the DC collection system is in the startup mode.

20. A protection device for a DC collection system, the protection device comprising:

a diode having its forward direction in a normal power flow of a region of the DC collection system;
a first switch in parallel with the diode;
a second switch in series with the diode; and
a control unit operable to:
   open the first switch so that current can flow through the diode in the forward direction without the first switch bypassing the diode, and close the first switch if no current is flowing through the diode in the forward direction and power is needed upstream of the diode; and
   close the second switch so that current can flow through the diode in the forward direction to an AC grid interface of the DC collection system, and open the second switch if no current is flowing through the diode in the forward direction due to a fault in a DC feeder to which the protection device is coupled,
wherein the control unit is operable to close the first switch and the second switch responsive to a startup command that indicates a startup mode in which power is needed upstream of the diode in the opposite direction as the normal power flow.

* * * * *